United States Patent [19]

Fabisak

[11] 4,228,206
[45] Oct. 14, 1980

[54] METHOD OF PROCESSING GLASS TUBING

[75] Inventor: John S. Fabisak, Greenland, N.H.

[73] Assignee: GTE Products Corporation, Stamford, Conn.

[21] Appl. No.: 40,267

[22] Filed: May 18, 1979

Related U.S. Application Data

[63] Continuation of Ser. No. 910,419, May 30, 1978, abandoned.

[51] Int. Cl.² .................... C03B 15/14; C03C 15/00; C03C 17/00
[52] U.S. Cl. .......................................... 428/35; 65/31; 65/88; 65/126; 65/130; 427/237
[58] Field of Search ................ 65/25 R, 25 RE, 30 R, 65/31, 88, 130, 131, 187; 427/237, 238; 428/35

[56] References Cited

U.S. PATENT DOCUMENTS

| 1,782,169 | 11/1930 | Kamita | 65/31 |
| 2,433,116 | 12/1947 | Greenbowe et al. | 65/187 X |
| 3,740,251 | 6/1973 | Repsher | 427/237 X |

FOREIGN PATENT DOCUMENTS 835820  5/1960  United Kingdom ................ 65/30 R Primary Examiner—Arthur D. Kellogg
Attorney, Agent, or Firm—James Theodosopoulos

[57] ABSTRACT

The alkali content of the inner surface of glass tubing is reduced by introducing an acidic gas into the glass tubing at the hot draw stage to react with alkali ions on the inner surface of the glass.

9 Claims, 1 Drawing Figure

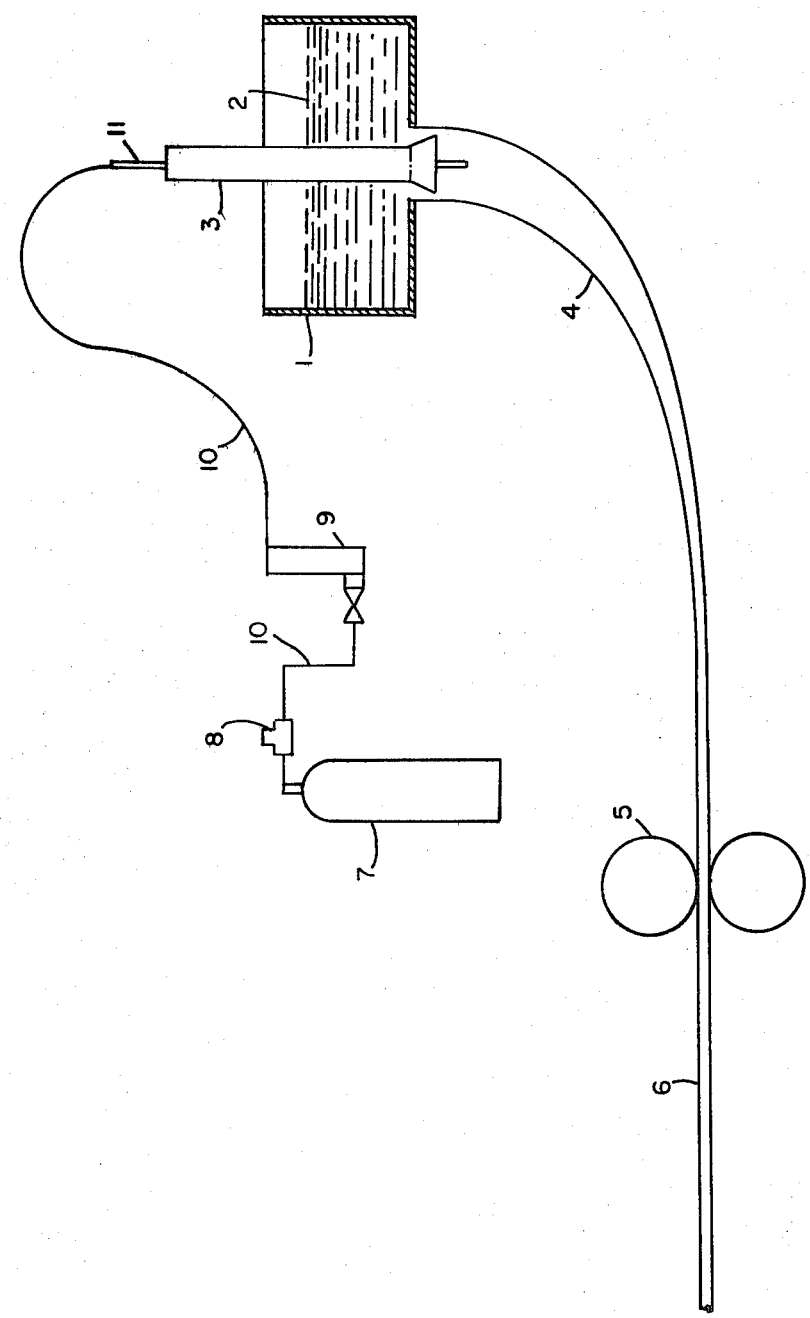

METHOD OF PROCESSING GLASS TUBING

This is a continuation of application Ser. No. 910,419, filed May 30, 1978, now abandoned.

THE INVENTION

This invention is concerned with reducing the alkali content on the inner surface of glass tubing. It is also concerned with tubular fluorescent lamps and with the method of making the glass tubes therefor. Fluorescent lamps generally comprise a sealed glass tube having electrodes at each end, a fill including mercury and an ionizable gas, and a phosphor coating on the inner surface of the glass tube.

I have found that when the glass tubing for such lamps is processed in accordance with this invention, the brightness of the lamps is increased, that is to say, the efficiency of the lamps in terms of lumens per watt is improved. The glass tubing is treated with an acidic gas at the time of drawing in order to reduce the alkali content of the inner glass surface. Such reduction in alkali content results in increased lamp brightness.

The drawing is a diagrammatic representation of apparatus that can be used to practice the invention.

As shown in the drawing, a tank 1 contains molten glass 2 which is drawn down around mandrel 3 to form a bag 4 of softened glass which is drawn by tractor 5 to form tubing 6. This process is known and is shown, for example, in U.S. Pat. No. 2,009,793. A cylinder 7 contains an acidic gas having a pH between 0 to 4, for example, hydrogen chloride or sulfur dioxide or nitric oxide. The gas is fed through a pressure regulator 8 and a flowmeter-valve assembly 9, by means of acid-resistant lines 10, to delivery tube 11. Delivery tube 11 is disposed within mandrel 3, and the bottom of delivery tube 11 projects into bag 4 where the gas can be directed against the softened glass. At the high temperature of the softened glass, say, about 800° to 950° C., the glass reacts with alkali ions in the glass to form a water soluble salt on the inner surface which is detached from the glass matrix. This salt can be removed during the process of lamp making by the normal washing procedures prior to applying the phosphor coating or by a similar rinsing operation if the glass is to be used for other purposes.

In a specific example, the glass used was a soda lime glass of the type generally used in making fluorescent lamp tubes. The acidic gas was hydrogen chloride which was introduced into bag 4 through delivery tube 11 at a flow rate of about 15 liters per minute. Glass tubing 6 was cut up into 4 foot lengths for making fluorescent lamps. The inner surface of the glass tubing, after washing, was analyzed by Auger electron microscopy, which showed that the acidic gas treatment reduced the amount of sodium at the surface to 1%. On an untreated glass surface, the sodium content was 5%.

On 40 watt cool white lamps made from the acid-treated glass tubing, the initial brightness was 3206 lumens, which is a 26 lumen improvement over the same lamps made with untreated glass tubing. The improvement in brightness at 100 hours was greater, 41 lumens.

On 35 watt lamps having a conductive coating on the glass for better lamp ignition, the improvement was greater; it was 48 lumens on initial lamp brightness and 62 lumens at 100 hours.

I claim:

1. The method of making fluorescent lamps so as to increase the brightness thereof comprising the steps of: drawing hot glass from a melt through a bag stage, where the glass is above its softening temperature, and into the shape of tubing; dispensing into the hot bag an acidic gas which reacts with alkali on the inner surface of the hot glass to form water soluble alkaline salts; cooling the tubing and cutting it into predetermined lengths; coating said predetermined lengths with phosphor; and forming said coated predetermined lengths into fluorescent lamps.

2. The method of claim 1 wherein the gas has a pH between 0 and 4.

3. The method of claim 1 wherein the gas is hydrogen chloride.

4. The method of claim 1 wherein the gas is sulphur dioxide.

5. The method of claim 1 wherein the gas is nitric oxide.

6. The method of claim 1 wherein the temperature of the glass at the point where the gas is introduced is between about 800° and 950° C.

7. The method of claim 1 including the step of washing the cut lengths to remove the water soluble alkaline salts.

8. The method of claim 7 including the step of phosphor coating the inner surface of the washed lengths of tubing.

9. A fluorescent lamp made by the method of claim 1.

* * * * *